United States Patent Office 3,165,512
Patented Jan. 12, 1965

3,165,512
MORPHOLINONES
Paul Moser, Basel, Switzerland, assignor to Geigy Chemical Corporation, Ardsley, N.Y., a corporation of Delaware
No Drawing. Filed Sept. 22, 1961, Ser. No. 139,874
Claims priority, application Switzerland, Sept. 23, 1960, 10,761/60; Aug. 18, 1961, 9,671/61
7 Claims. (Cl. 260—247.1)

This invention relates to novel derivatives of morpholinones substituted at the ring nitrogen atom by a saturated organic radical which radical contains an esterified bis-carboxymethylamino group and which morpholinone derivatives are useful for the chelating of metals. The invention also pertains to processes for their manufacture.

More particularly, this invention resides in substituted morpholinone compounds which may be represented by the following general Formula I:

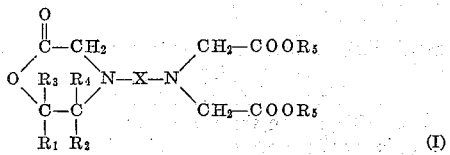

(I)

In this Formula I,
$R_1$, $R_2$, $R_3$ and $R_4$ independently of each other each represent hydrogen or an aliphatic radical and two vicinal R's together also represent a fused ring and X represents a divalent saturated organic radical the chain of which, which links the N atoms direct, can also contain oxygen, sulphur or amino nitrogen, whereby the hetero atoms are each bound by a chain containing at least 2 carbon atoms,
X represents a divalent saturated organic radical the chain of which, which links the N atom direct, can also contain oxygen or sulphur, whereby the hetero atoms are each bound by a chain containing at least 2 carbon atoms, and
$R_5$ is an alkyl or aralkyl radical.

It has been found, that according to the invention prefered compounds of the general Formula I are compounds, wherein $R_1$, $R_2$, $R_3$ and $R_4$ is hydrogen. If two vicinal R's together form a fused ring, then this is preferably a cyclohexane ring. $R_5$ is preferably an alkyl radical with at most 6 carbon atoms, in particular the ethyl radical, and X is preferably the —$CH_2CH_2$—, —$CH_2CH_2OCH_2CH_2$— and —$CH_2CH_2SCH_2CH$— radical.

The compounds of the above Formula I may be synthesized by exhaustively cyanomethylating the nitrogen atoms of an amino compound of the general Formula II

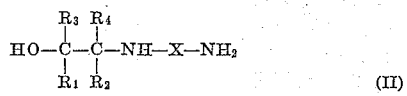

(II)

wherein $R_1$, $R_2$, $R_3$ and $R_4$ have the meanings given above, reacting the cyano groups in the cyanomethyl compound so obtained with a monovalent alcohol of the general Formula IA $$R_5—OH \qquad (IA)$$

wherein $R_5$ has the meaning given above, to form corresponding imino ethers and hydrolysing these to form esters of the above defined general Formula I.

Starting materials of the general Formula II are obtained, for example, by adding one mole of alkylene oxide to one mole of a diprimary amine corresponding to the formula $H_2N—X—NH_2$, or by condensing one mole of an alkylene halogenhydrin with one mole of such a diprimary amine.

The compounds of Formula II are preferably cyanomethylated with hydrogen cyanide and formaldehyde in aqueous solution, for which purpose, for example, the salts of hydrocyanic acid in the presence of strong mineral acids can be used. The cyanomethyl compounds formed are heated in monovalent alcohols of the general Formula IA, in particular in low molecular alkanols, preferably in ethanol, in the presence of a strong acid, particularly hydrogen halide, e.g. in the presence of HCl. The imino ethers so formed are then hydrolysed to esters, possibly while gently heating.

Examples of compounds of Formula II, which can be used according to the invention are: N-β-hydroxyethyl-ethylenediamine, N-β-hydroxyethyl-bis-(β-aminoethyl)-ether or -thioether, N - β - hydroxyethylaminoethyl-N-β-aminoethyl-methylamine, ethylene glycol-O-β-aminoethyl-O'-(β-hydroxyethylaminoethyl)-ether, N-β-hydroxyethyl-aminoethyl-N'-aminoethyl-ethylenediamine, N-β-hydroxypropyl - ethylenediamine or N - (2 - hydroxycyclohexyl)-ethylenediamine.

The compounds of the above defined Formula I may also be synthesized by exhaustively cyanomethylating the nitrogen atoms of an amino compound of the general Formula II, saponifying the cyano groups in the cyanomethyl compound obtained to carboxy groups and esterifying the polyacetic acid obtained with a monovalent alcohol of the general Formula IA. This saponification is advantageously performed by heating in aqueous-acid or in aqueous-alkaline medium. The cyanomethylation in this case is performed advantageously with hydrogen cyanide and formaldehyde or with glycolic acid nitrile in aqueous solution, the salts of the hydrogen cyanide, for example, being used in the presence of strong mineral acids. The cyanomethylation can also be performed in aqueous, strongly alkaline medium in which case instead of the cyanomethyl compounds the corresponding polyacetic acids are obtained.

The compounds of the general Formula I according to the invention may also be synthesized by exhaustively carboxymethylating the nitrogen atoms of an amino compound of the general Formula II and reacting the polyacetic acid obtained, e.g. in the presence of acid catalysts, with a monovalent alcohol of the general Formula IA to form an ester of the general Formula I.

This carboxymethylation is preferably performed in an aqueous alkaline medium with water-soluble salts of halogen acetic acids, in particular with the alkali metal salts of chloroacetic or bromoacetic acid. The polyacetic acids obtained are esterified with a monovalent alcohol of the general Formula IA by heating in the presence of a suitable esterification catalyst, e.g. a hydrogen halide such as hydrogen chloride or bromide. Suitable alcohols are principally lower alkanols, in particular ethanol.

The compounds of the Formula I according to the invention are oily, pale yellowish liquids or solid substances. Compounds have already been described which with metal have chelating properties and which dissolve well either in water or in organic solvents, but are not soluble in both types of solvents at the same time. The compounds of the Formula I according to the invention are soluble in water and in organic solvent such as in alkanols, aliphatic ketones, ethers, aromatic hydrocarbons and chlorinated hydrocarbons.

Due to their solubility in aqueous and organic solvent systems, these compounds can be used in many ways. For example, aqueous, organic or aqueous-organic solutions coloured by metals especially iron ions can be decoloured with the aid of these compounds.

A very important field for the use of these compounds is the removal of undesirable metals from an organism in the form of stable, water soluble complex compounds which can be excreted.

It is known that an organism which is contaminated by radioactive substances such as, e.g. fission products of heavy atomic nuclei, e.g. $Ce^{144}$, $Pr^{144}$, $Eu^{154}$, $Ho^{166}$, $Tm^{170}$, $Y^{90}$ or with heavy radioactive isotopes, e.g. $U^{233}$, $Pu^{239}$ or $Am^{241}$, which occur on working with reactors, suffers serious injuries to health.

It has been found that injuries of this type can be avoided to a great extent by introducing a compound of the general Formula I into the circulation of the organism. For this purpose, these compounds, advantageously in the form of 0.1% to 5% sterile, aqueous solutions which preferably also contain glucose or sodium chloride, are injected intravenously, intraperitoneally or intramuscularly or are administered perorally into the organism contaminated by radioactive substances. Because of their ability to form water soluble, stable complex compounds with metals, they bring about a quick excretion of the radioactive substances from the organism contaminated therewith.

The following examples illustrate the invention. Where not otherwise stated, parts are given as parts by weight. The temperatures are in degrees centigrade. The relationship of parts by weight to parts by volume is as that of kilogrammes to litres.

EXAMPLE 1

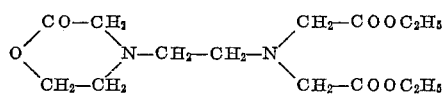

1 part of N-(2-hydroxyethyl)-ethylenediamine in 3.5 parts of water is added at 15° within 2 hours to 2.34 parts of 37% formaldehyde in 2.3 parts of water and then 2.85 parts of 96% sulphuric acid are added within 10 to 12 hours at the same temperature. 1.47 parts of sodium cyanide in 5 parts of water are added dropwise to this reaction mixture, the temperature being kept under 15° by cooling during the addition of two-thirds of this solution. During the addition of the last third of the solution, the exterior cooling is removed whereupon the temperature of the solution rises to about 40°. The reaction mixture is then heated to 60° for 6 hours and finally concentrated to a small volume in vacuo. The sodium bisulphate formed is precipitated by the addition of ethanol, filtered off and the N-(2-hydroxyethyl)-N,N',N'-tris-cyanomethyl-ethylenediamine is obtained in an oily form from the filtrate by evaporating off the solvent. It is dissolved in 200 parts of anhydrous ethanol and hydrogen chloride is introduced while cooling until the solution is saturated. The mixture is left to stand for 12 hours. The solvent is then evaporated off in vacuo, the oily residue is taken up in a little water, the aqueous solution is neutralized with sodium bicarbonate and the morpholinone which is liberated is taken up in diethyl ether. The N-(β-N',N'-biscarbethoxymethyl-aminoethyl)-morpholinone-(2) is purified by distillation in a high vacuum and is obtained as a brownish oil: B.P.$_{0.02}$ 198–200°.

At room temperature, concentrations of up to 10% of the substance dissolve completely in water and the reaction of the solutions are practically neutral. The substance also dissolves well in benzene and chloroform.

If methanol is used for the esterification instead of ethanol and otherwise the same procedure is followed, then N-β-N',N'-bis-carbomethoxymethyl-aminoethyl morpholinone-(2) is obtained. It is a yellow-brown oil which boils at 190–193° under 0.01 mm. Hg pressure. The substance is up to 5% soluble in water with a neutral reaction at room temperature. It dissolves well in benzene and chloroform.

EXAMPLE 2

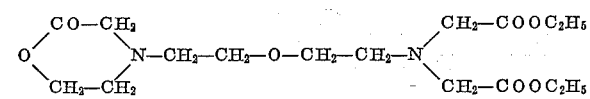

1 part of N-(2-hydroxyethyl)-β,β'-diaminodiethyl ether in 3.5 parts of water is added at 15° within 2 hours to 2.18 parts of 37% formaldehyde in 2.3 parts of water and then 2.70 parts of 96% sulphuric acid are added at the same temperature. A solution of 1.37 parts of sodium cyanide in 5 parts of water is added dropwise to this reaction mixture, the temperature being kept under 15° by cooling during the addition of two-thirds of this solution. The exterior cooling is removed during the addition of the last third of the solution whereupon the temperature of the solution rises to about 40°. The reaction mixture is then heated for 6 hours at 60° whereupon it is concentrated to a small volume in vacuo. The sodium bisulphate formed is precipitated by the addition of ethanol, filtered off under suction and the N-(2-hydroxyethyl)-N,N',N'-tris-cyanomethyl-β,β' - diaminodiethyl ether is obtained in an oily form from the filtrate after evaporating off the solvent. It is taken up in 100 parts of anhydrous ethanol and hydrogen chloride is introduced into the solution, while cooling until saturation is reached whereupon this mixture is left to stand for 12 hours. The morpholinone of the formula given above is isolated analogously to Example 1. It is a yellow-brown oil which can be distilled in a bulb tube under a pressure of 0.03 mm. Hg and an airbath temperature of 215°. A redistilled sample boils at 211–213° under 0.005 mm. Hg. The substance dissolves well in water at room temperature with a neutral reaction. It is also soluble in benzene or chloroform.

EXAMPLE 3

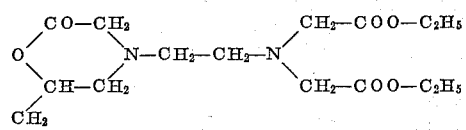

A solution of 1.14 parts of sodium hydroxide in 3 parts of water is added dropwise with good cooling to 2.71 parts of monochloroacetic acid in 7 parts of water, the addition being so made that the temperature never exceeds 10°. 1 part of N-β-hydroxypropyl-ethylenediamine is added to this solution and the reaction mixture is heated to 70°. Then 30% caustic soda lye is added to the reaction mixture so that the latter always reacts alkaline to thymolphthalein. When no more caustic soda lye is required, the solution is heated for 4 hours at 70°, the reaction mixture is made acid to congo paper with hydrochloric acid and is evaporated to dryness. This product, which contains N-β-hydroxypropyl-N,N',N'-tris-carboxymethyl-ethylenediamine, is esterified in the usual way, e.g. by heating with anhydrous ethanol which has been saturated with hydrogen chloride. The water formed in the esterification is removed with benzene by azeotropic distillation. The undissolved sodium chloride is then filtered off and the solvent is evaporated off. The residue containing the morpholinone hydrochloride is taken up in 1 part of anhydrous ethanol and the concentration of chlorine ions in this solution is determined. To liberate the morpholinone, 2.85 parts of triethylamine are added per 1 part chloride ions and the triethylamine hydrochloride which slowly precipitates is filtered off. The solvent is removed from the filtrate and the oily residue is fractionated in vacuo. The morpholinone of the formula given above is a yellow-brown oil which boils at 206–208° under 0.006 mm. Hg pressure. The substance dissolves in water with a neutral reaction up to 5% at room temperature and it dissolves well in benzene and chloroform.

EXAMPLE 4

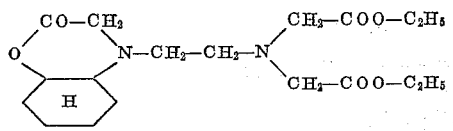

1 part of N-(2-hydroxycyclohexyl)-ethylenediamine, 1.16 parts of sodium cyanide and 0.1 part of sodium hydroxide are dissolved in 3 parts of water. 0.47 part of 37% formaldehyde in 3.4 parts of water are added dropwise to this solution at 10° within 20 hours. Then 3.4 parts of water containing ammonia are distilled off in vacuo. A solution of 0.29 part of 37% formaldehyde in 2.4 parts of water is then added dropwise at 15° within 8 hours at the end of which time, the water added is again distilled off in vacuo. This procedure is repeated four times, each time the temperature of the reaction mixture during the addition of the formaldehyde being raised by 5°. After, in all, 1.92 parts of 37% formaldehyde have been added, the solution is made acid to congo paper with hydrochloric acid, and evaporated to dryness. The acid contained in the residue is esterified with ethanol under the conditions described in Example 2. After the esterification the reaction mixture, from which the ethanol has been removed, is taken up in a little water, neutralised with sodium hydrogen carbonate and the liberated morpholinone is extracted with diethyl ether. It is purified by distillation in a high vacuum. B.P. 203–207° under 0.03 mm. Hg. The morpholine of the formula given above is a yellow oil which is soluble in water up to 0.5% with a neutral reaction. It also dissolves well in benzene and chloroform.

The N-(2-hydroxycyclohexyl)-ethylenediamine used as starting material is obtained by the slow addition dropwise of 0.45 part of 2-chlorocyclohexanol to 1 part of boiling ethylenediamine. After neutralising the acid formed in the condensation with caustic soda lye, the reaction mixture is fractionated in vacuo (B.P. 148–150° under 11 mm. Hg).

EXAMPLE 5

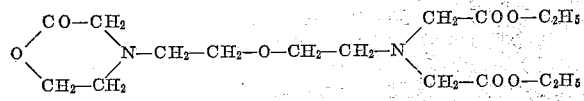

A solution of 0.91 part of sodium hydroxide in 2.5 parts of water is so added dropwise to 2.16 parts of monochloroacetic acid in 5.5 parts of water while cooling well that the temperature never exceeds 10°. 1 part of N-β-hydroxyethyl-bis(β-aminoethyl)-ether is added to this solution and the whole is warmed to 70°. 30% caustic soda lye is then added to the reaction mixture in such a manner that there is always a clear alkaline reaction to thymolphthalein. When no more lye is needed, the solution is heated for 4 hours at 70°, then made acid to congo paper with hydrochloric acid and evaporated to dryness. The N-β-hydroxyethyl - N,N',N' - tris - carboxymethyl-bis-(β-aminoethyl)-ether, which is to be found in the residue, is esterified and the ester formed is worked up as described in Example 2. The morpholinone of the formula given above is a yellow-brown oil: B.P. 211–213° under 0.005 mm. Hg. This substance is soluble in water, with a neutral reaction, at room temperature up to 10% and it also dissolves well in benzene and chloroform.

The N-β-hydroxyethyl-bis-(β-aminoethyl)-ether used as starting material is obtained by slowly adding dropwise 2-chloro-ethanol to a great excess of boiling 30% solution of bis-(β-aminoethyl)-ether. The hydroxyethylated amine boils at 161–163° under 11 mm. Hg.

EXAMPLE 6

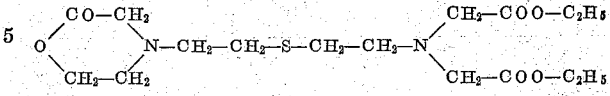

A solution of 0.87 part of sodium hydroxide in 2 parts of water is so added dropwise while cooling well to 2.07 parts of monochloroacetic acid in 6.0 parts of water that the temperature never exceeds 10°. 1 part of N-β-hydroxyethyl-bis-(β-aminoethyl)-thioether is added to this solution and the whole is heated to 70°. 30% caustic soda lye is then so added to the reaction mixture that it always has a strong alkaline reaction to phenolphthalein. When no more caustic soda lye is needed, the reaction mixture is heated for 2 hours at 70°, the solution is made acid to congo paper with hydrochloric acid and then evaporated to dryness. The N-β-hydroxyethyl-N,N',N'-tris-carboxymethyl-bis-(β-aminoethyl)-ether, which is to be found in the residue, is esterified with ethanol as described in Example 2. After the esterification, the reaction mixture, from which the ethanol has been removed, is taken up in a little water, neutralised with sodium hydrogen carbonate, and the liberated morpholinone of the above formula is extracted with diethyl ether. After drying and evaporating the ethereal solution, the residue is distilled in a high vacuum whereupon the morpholinone of the above formula is obtained as a yellow oil which boils at 138–141° under 0.01 mm. Hg. It dissolves in water, with a neutral reaction, up to 5% and also dissolves well in benzene and chloroform.

The N-β-hydroxyethyl-bis - (β - aminoethyl) - thioether used as starting material is obtained by slowly adding dropwise 2-chloroethanol to a great excess of boiling 30% solution of bis-(β-aminoethyl)-thioether. The N-β-hydroxyethyl-bis-(β-aminoethyl)-ether boils at 168–171° under 1–2 mm. Hg.

EXAMPLE 7

Chlorinated phenol derivatives, for example chlorinated salicylanilides and o,o'-dioxydiphenylmethanes are good bactericides. On preparing and using this class of compounds, the discolouration of their solutions in organic solvents, e.g. in the production of disinfectant sprays, caused by traces of $Fe^{+3}$ ions is a disadvantage which is of practical importance. By the addition of N-(β-N',N'-bis-carbethoxymethyl - aminoethyl) - morpholinone-(2), such solutions are protected from discolouration or are themselves decoloured. In addition, when compared with the usual complex formers (such as, e.g. ethylenediamine tetra-acetic acid, polyphosphates), this compound has the advantage of a good action also in organic solvents (in particular ethanol, benzene, chloroform). It is also effective in water. Because of these properties, it has a colour-stabilising action in aqueous/organic emulsions also.

A solution of 0.07 part of tetrachlorosalicylanilide in 100 parts by volume of ethanol is coloured by the addition of $1.5 \cdot 10^{-4}$ parts of $FeCl_3$. Addition of 0.07 part of N-(β-N',N'-bis-carbethoxymethyl - aminoethyl - morpholinone-(2) to this red solution results in a discolouration.

EXAMPLE 8

1 μc. (microcurie) of $Ce^{144}Cl_3$ or $Y^{91}Cl_3$ was intravenously injected into rats. After 24 hours, 100 μmol of N - (β-N',N'-bis-carbethoxymethyl-aminoethyl)-morpholinone-(2) per rat were intravenously injected. Also 100 μmol of the acid (N-(2-hydroxyethyl)-N,N',N'-ethylenediamine triacetic acid) from which this substance is derived was intravenously injected in the form of the neutral sodium salt of its calcium complex into animals for comparison. The animals injected with $Ce^{144}$ were dissected on the 4th day and those injected with $Y^{91}$ were dissected on the 3rd day after the injection. Compared with control animals which received the same dosage of ratioactive cerium of yttrium but no complex former causing excretion, the following content of radioactive metal ions in the liver were obtained:

Table

| Excretion agent | Tests with Y$^{91}$ (5 animals) | | Tests with Ce$^{144}$ (6 animals) | |
|---|---|---|---|---|
| | Weight of animal in grammes | Content in liver in percent [1] | Weight of animal in grammes | Content in liver in percent [1] |
| Without | 134±10 | 3.19 | | 38.2 |
| Na salt of calcium complex of N-(2-hydroxyethyl)-N,N',N'-ethylenediamine triacetic acid | 134±5 | 3.18 | 188±6 | 37.0 |
| N-(β-N',N'-bis-carbethoxymethyl-aminoethyl)-morpholinone-(2) | 141±10 | 2.17 | | 28.9 |

[1] The figures are given in percentage of the amount of radioactive metal ions administered.

EXAMPLE 9

The precipitation of a heavy metal hydroxide caused by the addition of strong lye to the aqueous solution of the said heavy metal salt is prevented by the addition of N-(β - N',N'-bis-carbethoxymethyl-aminoethyl)-morpholinone-(2).

Thus, from a $10^{-3}$ molal aqueous solution of a Zn salt, the Zn hydroxide cannot be precipitated until a pH value of 11 by the addition of NaOH, if 0.10 part of the above-mentioned morpholinone were added previously per each 100 parts by volume of the solution. The Zn(OH)$_2$ precipitate is already formed at pH 8.0 in the absence of the said complex forming addition.

In an analogous manner, the precipitation of, for example, the following $10^{-3}$ molal aqueous solutions of salts of heavy metals can be prevented by the addition of the above mentioned morpholinone (0.10 part per 100 parts by volume of the solution): Fe$^{+2}$, Co$^{+2}$, Ni$^{+2}$, Cu$^{+2}$, Cd$^{+2}$, Hg$^{+2}$ and Pb$^{+2}$.

EXAMPLE 10

The formation of a copper complex in an ethanolic solution of N - (β - N',N' - bis - carbethoxymethyl-aminoethyl)-morpholinone-(2) is demonstrated by the following experiment: Addition of an equivalent amount of N-(β - N',N'-bis-carbethoxymethyl-aminoethyl)-morpholinone-(2) to an ethanolic solution of CuCl$_2$ results in a change of colour from green to blue. The absorption spectrum shows the formation of a complex compound. The ethanolic CuCl$_2$ solution shows an absorption maximum in the near infra-red region at 0.90μ, which is shifted by 0.10μ to shorter wave lengths after addition of an equivalent amount of morpholinone. The morpholinone itself shows no absorption in this region.

What is claimed is:

1. The morpholinone compound of the formula

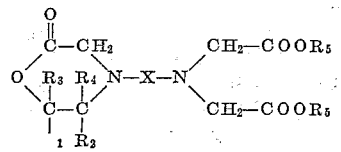

wherein

R$_1$, R$_2$, R$_3$ and R$_4$ independently of each other each is a member selected from the group consisting of hydrogen and lower alkyl, R$_5$ is a member selected from the group consisting of lower alkyl, phenyl(lower)alkyl and (lower)alkyl-phenyl(lower)alkyl, and X is a member selected from the group consisting of
—CH$_2$—CH$_2$—, —CH$_2$—CH$_2$—O—CH$_2$—CH$_2$— and —CH$_2$CH$_2$—S—CH$_2$—CH$_2$—

2. The morpholinone compound of the formula

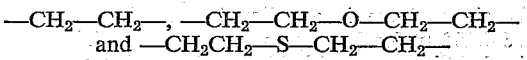

3. The morpholinone compound of the formula

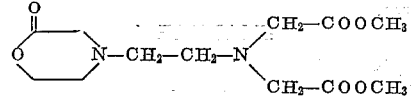

4. The morpholinone compound of the formula

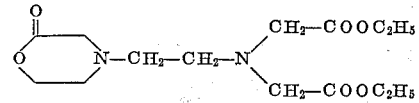

5. The morpholinone compound of the formula

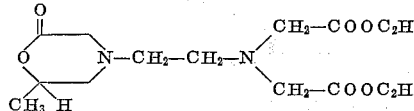

6. The morpholinone compound of the formula

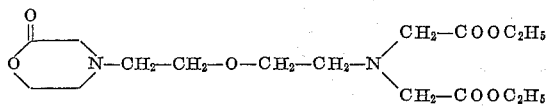

7. The morpholinone compound of the formula

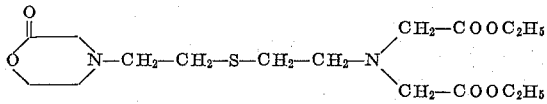

References Cited by the Examiner

UNITED STATES PATENTS

| | | | |
|---|---|---|---|
| 2,229,024 | 1/41 | Bruson | 260—247.1 |
| 2,483,436 | 10/49 | Riveschl | 260—247.1 |
| 2,630,455 | 3/53 | Bersworth | 260—534 |
| 2,759,935 | 8/56 | Speeter | 260—247.2 |
| 2,789,938 | 4/57 | Wilcox et al. | 167—55 |
| 2,803,627 | 8/57 | Geschickter et al. | 260—247.2 |
| 2,840,505 | 6/58 | Grunert et al. | 167—55 |
| 2,868,724 | 1/59 | Zeck | 210—58 |
| 2,894,905 | 7/59 | Bernard | 210—58 |
| 2,913,458 | 11/59 | Druey et al. | 260—247.1 |
| 2,957,872 | 10/60 | Huebner | 260—247.1 |
| 3,038,896 | 6/62 | Habicht et al. | 260—239 |

OTHER REFERENCES

Martell: Chemistry of the Metal Chelate Compounds, pages 532–541, Englewood Cliffs, Prentice-Hall, 1952.

IRVING MARCUS, *Primary Examiner.*

DUVAL T. McCUTCHEN, WALTER A. MODANCE, *Examiners.*